(12) United States Patent
Paul et al.

(10) Patent No.: US 8,385,337 B2
(45) Date of Patent: *Feb. 26, 2013

(54) DETERMINING PACKET FORWARDING INFORMATION FOR PACKETS SENT FROM A PROTOCOL OFFLOAD ENGINE IN A PACKET SWITCHING DEVICE

(75) Inventors: Arindam Paul, Sunnyvale, CA (US); Somala Krishna Reddy, San Ramon, CA (US); David Delano Ward, Somerset, WI (US); Fan Sun, Fremont, CA (US); Shyamsundar Nandkishor Maniyar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/983,003

(22) Filed: Dec. 31, 2010

(65) Prior Publication Data

US 2011/0096777 A1 Apr. 28, 2011

Related U.S. Application Data

(63) Continuation of application No. 11/986,184, filed on Nov. 20, 2007, now Pat. No. 7,885,260.

(51) Int. Cl.
*H04L 12/28* (2006.01)

(52) U.S. Cl. ...................................... 370/389; 370/392

(58) Field of Classification Search .................. None
See application file for complete search history.

(56) References Cited

U.S. PATENT DOCUMENTS

| 6,853,617 | B2 | 2/2005 | Watson et al. |
| 7,424,014 | B2 | 9/2008 | Mattes et al. |
| 2003/0235195 | A1 | 12/2003 | Shenoy et al. |
| 2005/0122986 | A1 | 6/2005 | Starr et al. |
| 2005/0131912 | A1 | 6/2005 | Lin et al. |
| 2005/0226238 | A1 | 10/2005 | Hoskote et al. |
| 2006/0062142 | A1 | 3/2006 | Appanna et al. |
| 2006/0262716 | A1 | 11/2006 | Ramaiah et al. |
| 2006/0262734 | A1 | 11/2006 | Appanna et al. |
| 2007/0070901 | A1 | 3/2007 | Aloni et al. |
| 2007/0195773 | A1 | 8/2007 | Tatar et al. |
| 2008/0291906 | A1 | 11/2008 | Chigurupati et al. |

*Primary Examiner* — Chirag G Shah
*Assistant Examiner* — Srinivasa Reddivalam
(74) *Attorney, Agent, or Firm* — The Law Office of Kirk D. Williams

(57) ABSTRACT

Disclosed are, inter alia, methods, apparatus, computer-readable media, mechanisms used in one embodiment configured for, and means for, determining packet forwarding information for packets sent from a protocol offload engine in a packet switching device. The protocol offload engine performs the protocol processing for a protocol application (e.g., BGP) running on a separate control plane processing system, and generates packets to be sent to external devices. The protocol offload engine sends these packets to one of the line cards without using the routing information lookup facility of the control plane processing system, thereby, freeing the control plane processing system to use those processing cycles to perform other tasks.

23 Claims, 7 Drawing Sheets

US 8,385,337 B2

DETERMINING PACKET FORWARDING INFORMATION FOR PACKETS SENT FROM A PROTOCOL OFFLOAD ENGINE IN A PACKET SWITCHING DEVICE

CROSS-REFERENCE TO RELATED APPLICATIONS

This is a continuation of copending nonprovisional application Ser. No. 11/986,184, filed Nov. 20, 2007, which is hereby incorporated by reference in its entirety.

TECHNICAL FIELD

The present disclosure relates generally to communications and computer systems, especially routers, packet switching systems, and other network devices.

BACKGROUND

The communications and computer industries are rapidly changing to adjust to emerging technologies and ever increasing customer demand for systems with increased performance. Note, nothing described or referenced in this document is admitted as prior art to this application unless explicitly so stated.

There are different architectures used for packet switching device (e.g., a router, or bridge). One known packet switching device uses a route processor to maintain forwarding information for how to route packets to other devices. The packet switching device communicates with other packet switching devices to exchange network topology information, such as using Border Gateway Protocol (BGP) over Transmission Control Protocol (TCP) sessions with the other packet switching devices. Based on the network topology, the router processor determines how to forward packets from the packet switching devices line cards and ports thereon. One known packet switching device distributes routing information, including the appropriate line card and port from which to forward specific packets based on their destination addresses, to the line cards. A line card can then perform a lookup operation on a packet to determine its routing information, and then correspondingly forward the packet out one of its ports, or forward the packet to another line card over a switching mechanism (e.g., switch fabric, crossbar, etc.), and the new line card sends the packet out the appropriate one of its ports.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
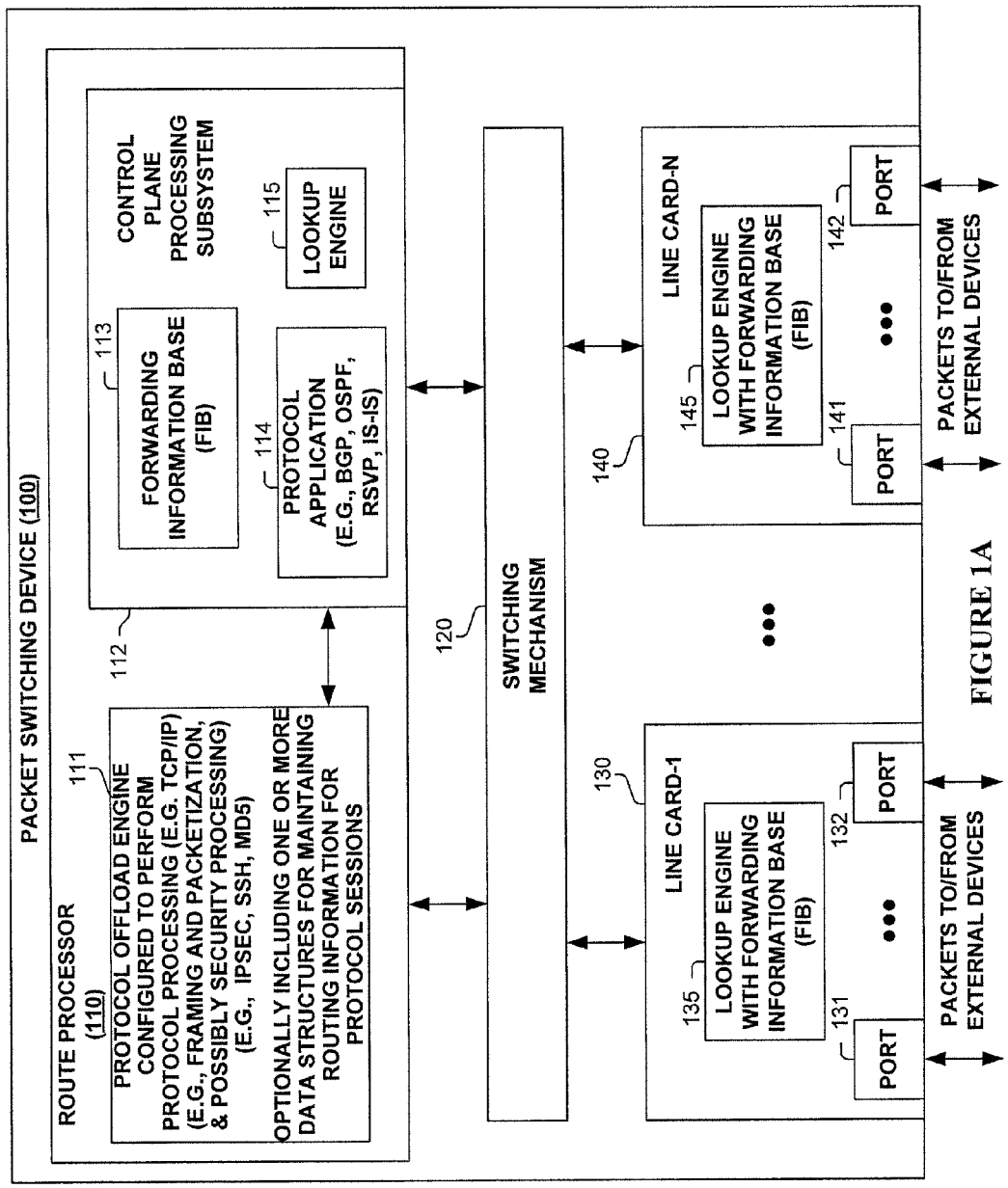
FIG. 1A illustrates a block diagram of a packet switching device of one embodiment.

Disclosed are, inter alia, methods, apparatus, computer-readable media, mechanisms used in one embodiment configured for, and means for, determining packet forwarding information for packets sent from a protocol offload engine in a packet switching device.

One embodiment includes a packet switching device including a route processor with a control plane processing subsystem and a protocol offload engine, multiple line cards, and a switching mechanism. The control plane processing subsystem exchanges network topology information over protocol sessions with external devices, and offloads the protocol processing of these protocol sessions to the protocol offload engine. The control plane processing subsystem maintains a Forwarding Information Base (FIB) which includes routing information on how to forward packets.

In one embodiment, the control plane processing subsystem performs a lookup operation for a data item to identify the routing information for the data item, and forwards the data item and routing information to the protocol offload engine so it knows how to forward the one or more packets it creates from the protocol processing of the data item.

In one embodiment, the protocol offload engine maintains a protocol forwarding information base comprising routing information for the plurality of protocol sessions of the route processor with external devices based on routing information received from the control plane processing subsystem. The control plane processing system forwards the data item to the protocol offload engine without any routing information. The protocol offload engine performs the protocol processing of the data item, and performs a lookup operation on its protocol forwarding information base comprising routing information to determine how to forward packet(s) created from the data item.

In one embodiment, the control plane processing system forwards the data item to the protocol offload engine without any routing information. The protocol offload engine performs the protocol processing of the data item, and forwards the data item to a line card, possibly selected at random. The selected line card performs a lookup operation on its maintained forwarding information base to determine routing information, and the line card either sends the packet out one of its ports, or forwards to the appropriate line card for sending out one of its ports. In one embodiment, the protocol offload engine is configured to learn on which particular line card packets of a particular protocol session of the plurality of protocol sessions are being received, and selects this line card to which to forward packets belonging to the particular protocol session.

2. Description

Disclosed are, inter alia, methods, apparatus, computer-readable media, mechanisms used in one embodiment configured for, and means for, determining packet forwarding information for packets sent from a protocol offload engine in a packet switching device. The protocol offload engine performs the protocol processing for a protocol application (e.g., BGP) running on a separate control plane processing system, and generates packets to be sent to external devices. The protocol offload engine sends these packets to one of the line cards without using the routing information lookup facility of the control plane processing system, thereby, freeing the control plane processing system to use those processing cycles to perform other tasks.

Embodiments described herein include various elements and limitations, with no one element or limitation contemplated as being a critical element or limitation. Each of the claims individually recites an aspect of the invention in its entirety. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms used in one embodiment configured for, and means for, determining packet forwarding information for packets sent from a protocol offload engine in a packet switching device.

One embodiment includes an apparatus for routing information, with the apparatus comprising: a plurality of line cards configured to send and receive packets with devices external to the apparatus, each of the plurality of line cards including a forwarding information base (FIB) configured to store routing information for determining where to send packets, and a lookup engine for performing lookup operations on the FIB for determining where to send packets; a route processor comprising a control plane processing subsystem and a protocol offload processing subsystem, the control plane processing subsystem configured to perform control plane processing including running a protocol application to maintain an forwarding information base (FIB) based on communications with external routing devices, and to update said FIBs in the plurality of line cards with at least portions of the FIB; wherein the control plane processing subsystem is configured to offload to the protocol offload engine the protocol processing, including framing and packetization of data, for a plurality of protocol sessions of the route processor with external devices; and a switching mechanism communicatively coupled to each of the plurality of line cards and to the route processor, the switching mechanism configured to communicate packets, including between line cards of the plurality of line cards and between line cards of the plurality of line cards and the route processor; wherein, for each particular data item of a series of data items generated by the protocol application to be sent to a device external to the apparatus from the protocol offload engine: the control plane processing subsystem is configured to communicate said particular data item to the protocol offload engine; and the protocol offload engine is configured to receive said particular data item and to perform said protocol processing of said particular data item, including framing and packetization of said particular data item, to generate one or more particular packets, and to forward said one or more particular packets to a line card of the plurality of line cards; and the line card is configured to perform one or more lookup operations in its said FIB to identify a particular line card and port for sending out said one or more particular packets, and if the particular line card is not the line card, then to forward said one or more particular packets to the particular line card which is configured to send said one or more particular packets out said port of the particular line to a device external to the apparatus; else to send said one or more particular packets out said port of the line card to a device external to the apparatus.

In one embodiment, said protocol processing of said particular data item includes security protocol processing. In one embodiment, said security protocol includes: IP Security (IPSec), Secure Shell (SSH), or Message-Digest algorithm 5 (MD5). In one embodiment, said protocol processing of said particular data item includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS). In one embodiment, the protocol offload engine is configured for each particular protocol session of the plurality of protocol sessions to randomly select the line card from the plurality of line cards to which it sends packets belonging to said particular protocol session.

One embodiment includes an apparatus for routing information, the apparatus comprising: a plurality of line cards configured to send and receive packets with devices external to the apparatus, each of the plurality of line cards including a forwarding information base (FIB) configured to store routing information for determining where to send packets, and a lookup engine for performing lookup operations on the FIB for determining where to send packets; a route processor comprising a control plane processing subsystem and a protocol offload processing subsystem, the control plane processing subsystem configured to perform control plane processing including running a protocol application to maintain an forwarding information base (FIB) based on communications with external routing devices, and to update said FIBs in the plurality of line cards with at least portions of the FIB; wherein the control plane processing subsystem is configured to offload to the protocol offload engine the protocol processing, including framing and packetization of data, for a plurality of protocol sessions of the route processor with external devices; and a switching mechanism communicatively coupled to each of the plurality of line cards and to the route processor, the switching mechanism configured to communicate packets, including between line cards of the plurality of line cards and between line cards of the plurality of line cards and the route processor; wherein the protocol offload engine is configured to learn on which particular line card packets of a particular protocol session of the plurality of protocol sessions are being received; and wherein, for each particular data item of a series of data items generated by the protocol application to be sent to a device external to the apparatus from the protocol offload engine: the control plane processing subsystem is configured to communicate said particular data item to the protocol offload engine; and the protocol offload engine is configured to receive said particular data item and to perform said protocol processing of said particular data item, including framing and packetization of said particular data item, to generate one or more particular packets, and to forward said one or more particular packets to said learned particular line card, and said learned particular line card is configured to send said one or more particular packets out one of its ports.

In one embodiment, the protocol offload engine is configured to learn on which particular port of the particular line card packets of the particular protocol session of the plurality of protocol sessions are being received; and wherein said learned particular line card is configured to send said one or more particular packets out said learned particular port of the particular line card. In one embodiment, said protocol processing of said particular data item includes security protocol processing. In one embodiment, said protocol processing of said particular data item includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS).

One embodiment includes an apparatus for routing information, the apparatus comprising: a plurality of line cards configured to send and receive packets with devices external to the apparatus; a route processor comprising a control plane processing subsystem and a protocol offload processing subsystem, the control plane processing subsystem configured to perform control plane processing including running a protocol application to maintain a forwarding information base (FIB) based on communications with external routing devices; wherein the control plane processing subsystem is configured to offload to the protocol offload engine the protocol processing, including framing and packetization of data, for a plurality of protocol sessions of the route processor with external devices; and a switching mechanism communicatively coupled to each of the plurality of line cards and to the route processor; wherein, for each particular data item of a series of data items generated by the protocol application to be sent to a device external to the apparatus from the protocol offload engine: the control plane processing subsystem is configured to perform a lookup operation in the FIB based on said particular data item to identify routing information for said particular data item and to communicate said particular data item and said routing information to the protocol offload engine; and the protocol offload engine is configured to receive said particular data item and said routing information, and to perform said protocol processing of said particular data item, including framing and packetization, to generate one or more particular packets; and to forward said one or more particular packets to a particular line card of the plurality of line cards identified by said routing information.

In one embodiment, for said each particular data item, said routing information for said particular data item includes the identification of a particular port of the particular line card; and wherein said one or more particular packets are sent from the apparatus from the particular port on the particular line card.

In one embodiment, the control plane processing subsystem is configured to generate a pre-built buffer header for the particular data item, the pre-built buffer header being communicated to the protocol offload engine, which is configured to include the pre-built buffer header in said one or more particular packets; wherein the pre built buffer item includes: a source address of the apparatus, a source port corresponding to the protocol application, a destination address of the device external to the apparatus, a destination port address, and a protocol type identifier. In one embodiment, said protocol processing of said particular data item includes security protocol processing. In one embodiment, said protocol processing of said particular data item includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS). In one embodiment, for said each particular data item, the particular line card is configured to send said one or more particular packets out one of its ports. In one embodiment, said operation of performing the lookup operation in the FIB based on said particular data item to identify routing information for said particular data item is performed prior to said operation of communicating said particular data item.

One embodiment includes an apparatus for routing information, the apparatus comprising: a plurality of line cards configured to send and receive packets with devices external to the apparatus; a route processor comprising a control plane processing subsystem and a protocol offload processing subsystem, the control plane processing subsystem configured to perform control plane processing including running a protocol application to maintain a forwarding information base (FIB) based on communications with external routing devices; wherein the control plane processing subsystem is configured to offload to the protocol offload engine the protocol processing, including framing and packetization of data, for a plurality of protocol sessions of the route processor with external devices; and a switching mechanism communicatively coupled to each of the plurality of line cards and to the route processor; wherein the protocol offload engine is configured to maintain a protocol forwarding information base comprising routing information for the plurality of protocol sessions of the route processor with external devices, said routing information being communicated to the protocol offload engine from the control plane processing subsystem; wherein, for each particular data item of a series of data items generated by the protocol application to be sent to a device external to the apparatus from the protocol offload engine: the control plane processing subsystem is configured to communicate said particular data item to the protocol offload engine; and the protocol offload engine is configured to receive said particular data item and to perform said protocol processing of said particular data item, including framing and packetization of said particular data item, to generate one or more particular packets, and to forward said one or more particular packets to a particular line card of the plurality of line cards determined based on said routing information stored in the protocol forwarding information base.

In one embodiment, said routing information for said one or more particular packets includes the identification of a particular port of the particular line card; and wherein said one or more particular packets are sent from the apparatus from the particular port. In one embodiment, said protocol processing of said particular data item includes security protocol processing. In one embodiment, said protocol processing of the particular packet includes, but is not limited to, Transmission Control Protocol (TCP) or Internet Protocol (IP) processing of the particular packet. In one embodiment, said protocol processing of said particular data item includes security protocol processing. In one embodiment, said security protocol includes, but is not limited to, IP Security (IP-Sec), Secure Shell (SSH), or Message-Digest algorithm 5 (MD5). In one embodiment the protocol application includes, but is not limited to, a routing application comprising Border Gateway Protocol (BGP), Open Shortest Path First (OSPF), Resource Reservation Protocol (RSVP), or Intermediate System-to-Intermediate System (IS-IS).

Expressly turning to the figures, FIG. 1 illustrates a packet switching device 100 (such as, but not limited to a router), including a route processor 110, a switching mechanism 120, and multiple line cards 130, 140.

Switching mechanism 120 is communicatively coupled to each of the line cards 130, 140 and to route processor 110, and is configured to switch packets between these entities. Line cards 130, 140 also each include a plurality of ports 131, 132, 141, 142 configured to send and receive packets with external devices.

Route processor 110 includes protocol offload engine 111 and control plane processing subsystem 112. As shown, these are typically implemented as separate subsystems, such as on different components, cards and/or boards. Control plane processing system 112 is configured to perform control plane processing including running a protocol application 114 (e.g., BGP, OPSF, RSVP, IS-IS, etc.) to maintain a forwarding information base (FIB) 113 based on communications with external routing devices. If one or more line cards 130, 140 maintain a forwarding information base (FIB) (135, 145), then control plane processing system 112 is further configured to update these forwarding information bases (FIBs) 135, 145 in the line cards 130, 140 with at least portions of the FIB 113. Control plane processing subsystem 112 includes a lookup engine 115 for performing a lookup operation in FIB 113 to identify routing information. Protocol offload engine 111 is configured to do the protocol processing for control plane processing subsystem's (112) protocol connections (e.g., TCP connections) with external devices for communicating network topology information. Protocol processing typically refers to the framing and packetization of data items and possibly security process (e.g., IPSec, SSH, MD5, etc.), as well as possibly other tasks or subtasks of these operations (e.g., state maintenance, packet counts, congestion control, packet reassembly, sliding window transmissions, etc.). This protocol processing can be an processor intensive process, especially when there are potential hundreds of connections maintained with external devices, and a topology change such as a port or line going down in a network, and proliferate thousands of changes which require thousands or more packets to be communicated between a packet switch and the other devices in the network. In one embodiment, protocol offload engine 111 includes one or more data structures (e.g., a protocol forwarding information base) for maintaining routing information for the protocol sessions between control plane processing subsystem 112 and the external devices.

In one embodiment, the control plane processing subsystem 112 performs a lookup operation using lookup engine 115 and FIB 113 for a data item to identify the routing information for the data item, and forwards the data item and routing information to protocol offload engine 111 so it knows how to forward the one or more packets it creates from the protocol processing of the data item.

In one embodiment, protocol offload engine 111 maintains a protocol forwarding information base comprising routing information for the protocol sessions of route processor 110/control plane processing subsystem 112 with external devices based on routing information received from the control plane processing subsystem 112 (e.g., from its FIB). It is well-known in the art on how to distribute routing information from an FIB to other components, and Li et al., discloses one such mechanism for selectively distributing a portion of such routing information in US Patent Publication 2005/0131912 A1, published on Jun. 16, 2005, which is hereby incorporated by reference. Control plane processing system 112 forwards the data item to protocol offload engine 111 without any routing information. Protocol offload engine 111 performs the protocol processing of the data item, and performs a lookup operation on its protocol forwarding information base comprising routing information to determine how to forward packet(s) created from the data item (e.g., to what line card and from what port of the line card from which to send the packet).

In one embodiment, control plane processing system 112 forwards the data item to protocol offload engine 111 without any routing information. Protocol offload engine 111 performs the protocol processing of the data item, and forwards the data item to any line card (130, 140), possibly selected at random. The selected/receiving line card (130, 140) performs a lookup operation on its maintained forwarding information base (135, 145) to determine routing information, and the line card (130, 140) either sends the packet out one of its ports (131-132, 141-142), or forwards to the appropriate line card (130, 140) for sending out one of its ports (131-132, 141-142). Note, all packets of a same protocol session are typically forwarded to the same selected line card (130,140) so that packet re-order is not introduced to the stream of packets belonging to a protocol session. Of course, if this selected path goes down, the packets are then sent over another path, either being predetermined or dynamically selected in response to the change in operable configuration of packet switching device 100.

In one embodiment, protocol offload engine 111 is configured to learn on which particular line card (130, 140) packets of a particular protocol session of the multiple maintained protocol sessions are being received, and selects this line card (130, 140) to which to forward packets belonging to the particular protocol session.

Figure 1B:
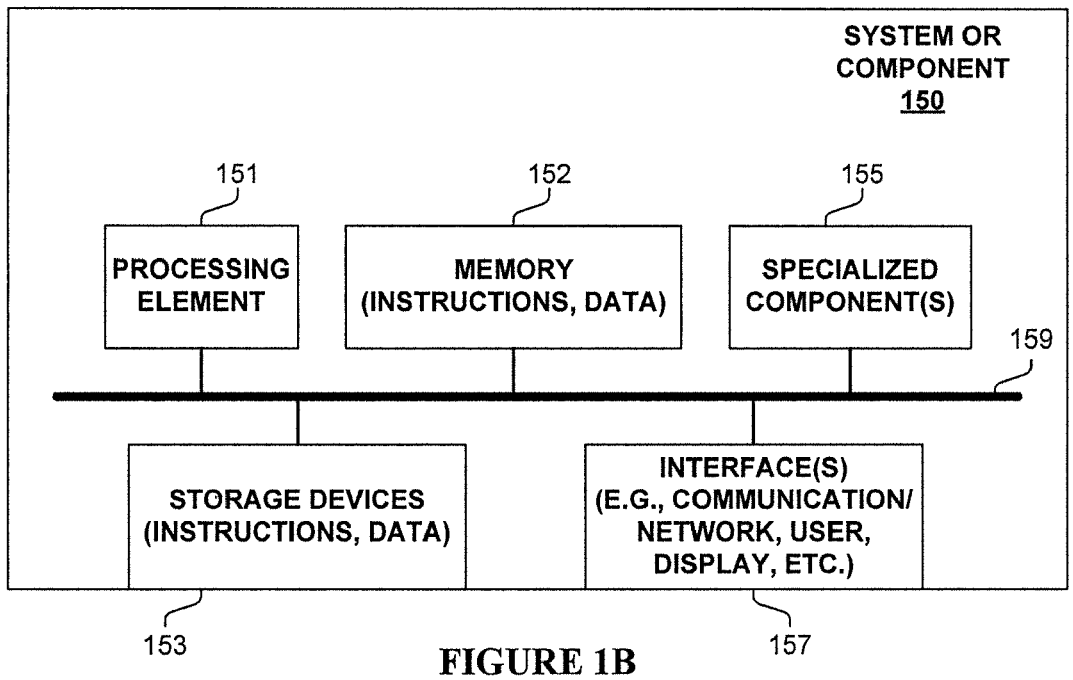
FIG. 1B illustrates an example system or component used in one embodiment.

FIG. 1B is block diagram of a system or component 150 used in one embodiment that determines packet forwarding information for packets sent from a protocol offload engine in a packet switching device. In one embodiment, system or component 150 performs one or more processes corresponding to one of the flow diagrams illustrated or otherwise described herein. In one embodiment, protocol offload engine 111 (FIG. 1A) includes system or component 150. In one embodiment, control plane processing subsystem 111 (FIG. 1A) includes system or component 150. In one embodiment, line card (130, 140) (FIG. 1A) includes system or component 150.

In one embodiment, system or component 150 includes a processing element 151, memory 152, storage devices 153, specialized components 155 (e.g. optimized hardware such as for performing lookup operations such as an content-associative memory, etc.), and interfaces 157 for communicating information (e.g., sending and receiving packets) which are typically communicatively coupled via one or more communications mechanisms 159, with the communications paths typically tailored to meet the needs of the application.

Various embodiments of component 150 may include more or less elements. The operation of component 150 is typically controlled by processing element 151 using memory 152 and storage devices 153 to perform one or more tasks or processes. Memory 152 is one type of computer-readable medium, and typically comprises random access memory (RAM), read only memory (ROM), flash memory, integrated circuits, and/or other memory components. Memory 152 typically stores computer-executable instructions to be executed by processing element 151 and/or data which is manipulated by processing element 151 for implementing functionality in accordance with an embodiment. Storage devices 153 are another type of computer-readable medium, and typically comprise solid state storage media, disk drives, diskettes, networked services, tape drives, and other storage devices. Storage devices 153 typically store computer-executable instructions to be executed by processing element 151 and/or data which is manipulated by processing element 151 for implementing functionality in accordance with an embodiment.

Figure 2:
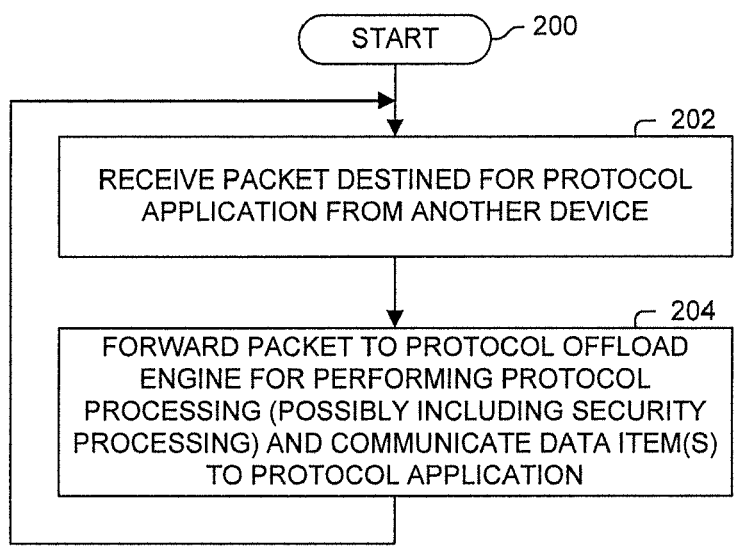
FIG. 2 illustrates a flow diagram of a process used in one embodiment.

FIG. 2 illustrates a process used in one embodiment. Processing begins with process block 200. In process block 202, a packet is received from another devices, with this packet being destined for the protocol application. In process block 204, the packet is forwarded to the protocol offload engine to perform the protocol processing (e.g., framing and packetization and possibly security processing) and to communicate one or more corresponding data items to the protocol application. In one embodiment, such a protocol application packet is initially received by the control plane processing subsystem and then forwarded to the protocol offload engine. In one embodiment, the packet switching device is subsequently configured to send packets belonging to that protocol session directly to the protocol offload engine. Processing returns to process block 202 for receive a next packet.

Figure 3:
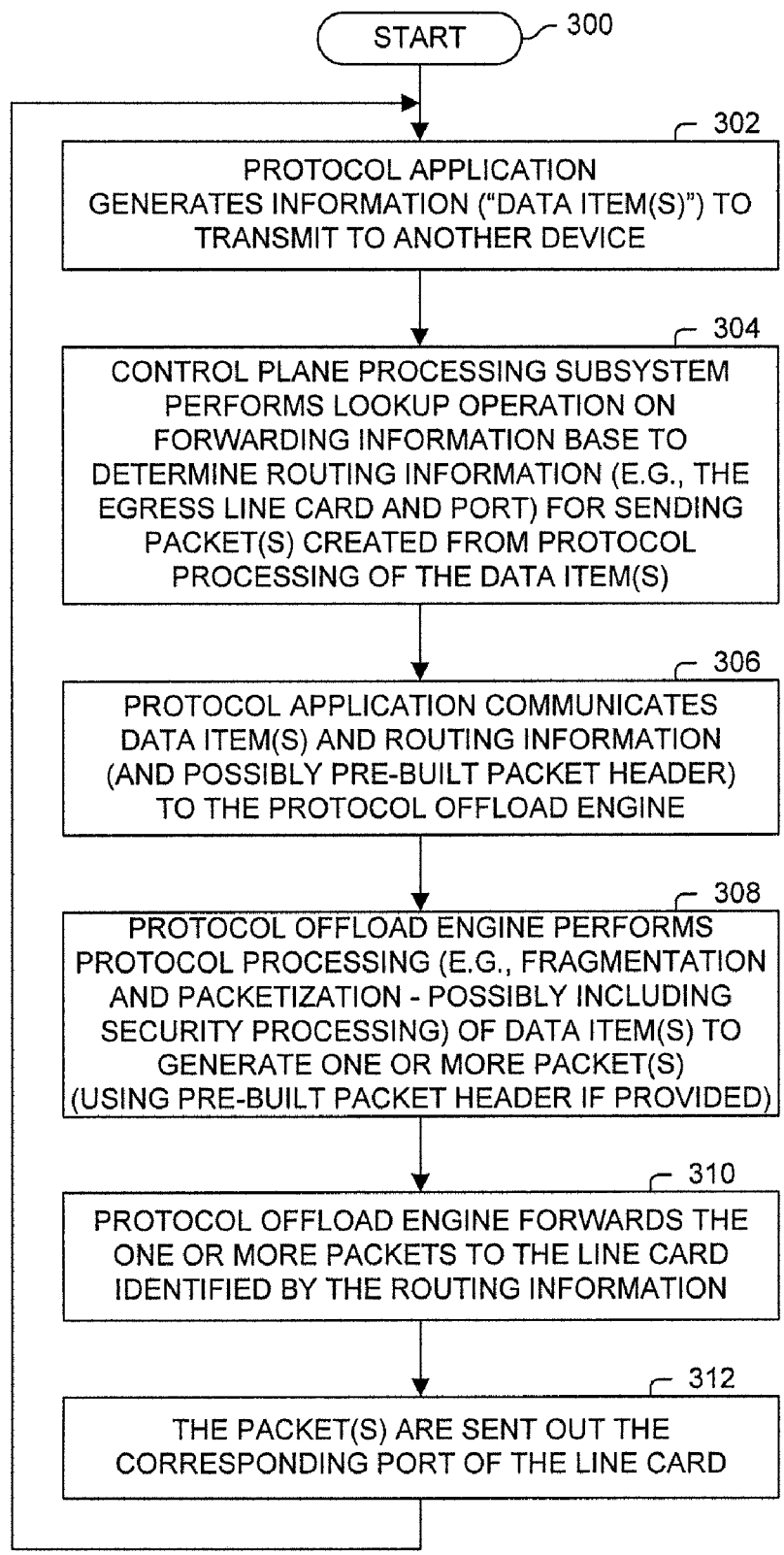
FIG. 3 illustrates a flow diagram of a process used in one embodiment.

FIG. 3 illustrates a process used in one embodiment. Processing begins with process block 300, and proceeds to process block 302, wherein a protocol application generates information (one or more data items) to be communicated to another device. In process block 304, the control plane processing subsystem performs a lookup operation in its FIB to determine routing information (e.g., line card, port) for sending packets created from the protocol processing of the one or more data items. In process block 306, the protocol application communicates these one or more data items and the determined routing information to the protocol offload engine. In one embodiment, a pre-built packet header is also communicated to the protocol offload engine, with this pre-built packet header including such information as the source address, source port, destination address, destination port, and protocol type so that the protocol offload engine can directly use this header in generating the packets to be sent out. In process block 308, the protocol offload engine performs the protocol processing (e.g., framing and packetization and possibly security processing) of the one or more data items to generate one or more packets (using the pre-built header if supplied in the one embodiment). In process block 310, the protocol offload engine forwards the generated one or more packets to the line card identified by the routing information; and in process block 312, the packets are sent out of the corresponding port (e.g., identified by the routing information) of the line card. Processing returns to process block 302.

Figure 4A:
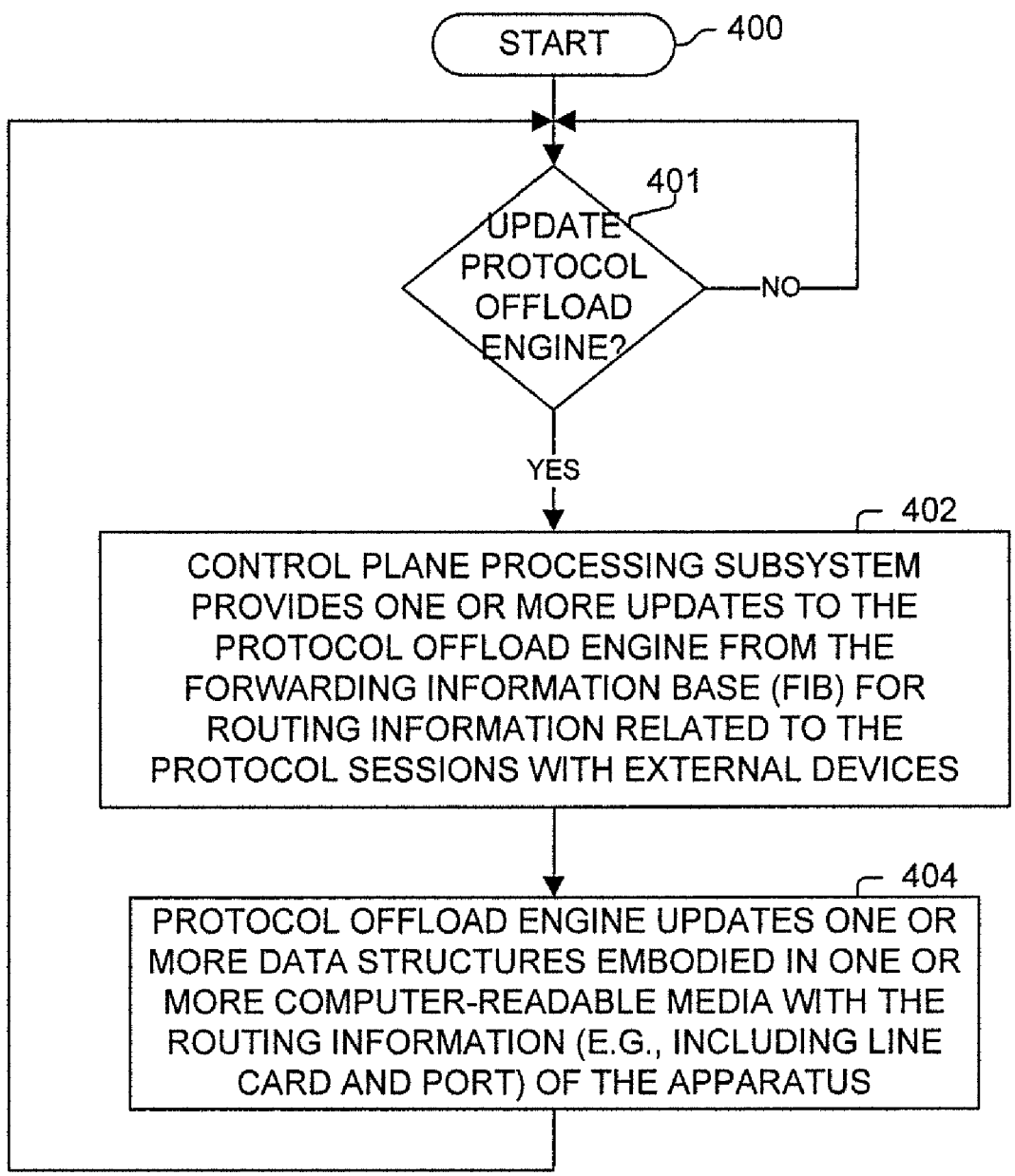
FIG. 4A illustrates a flow diagram of a process used in one embodiment.

FIG. 4A illustrates a process used in one embodiment wherein the protocol offload engine maintains a small, protocol forwarding information base for determining routing information for packets it creates. Processing begins with process block 400. As determined in process block 401, if the protocol offload engine needs updating, then in process block 402, the control plane processing subsystem provides one or more updates to the protocol offload engine from its FIB for routing information related to the protocol sessions with external devices. In process block 404, the protocol offload engine updates its one or more data structures embodied in one or more computer-readable media with this routing information (e.g., line card, port). Processing returns to process block 401.

Figure 4B:
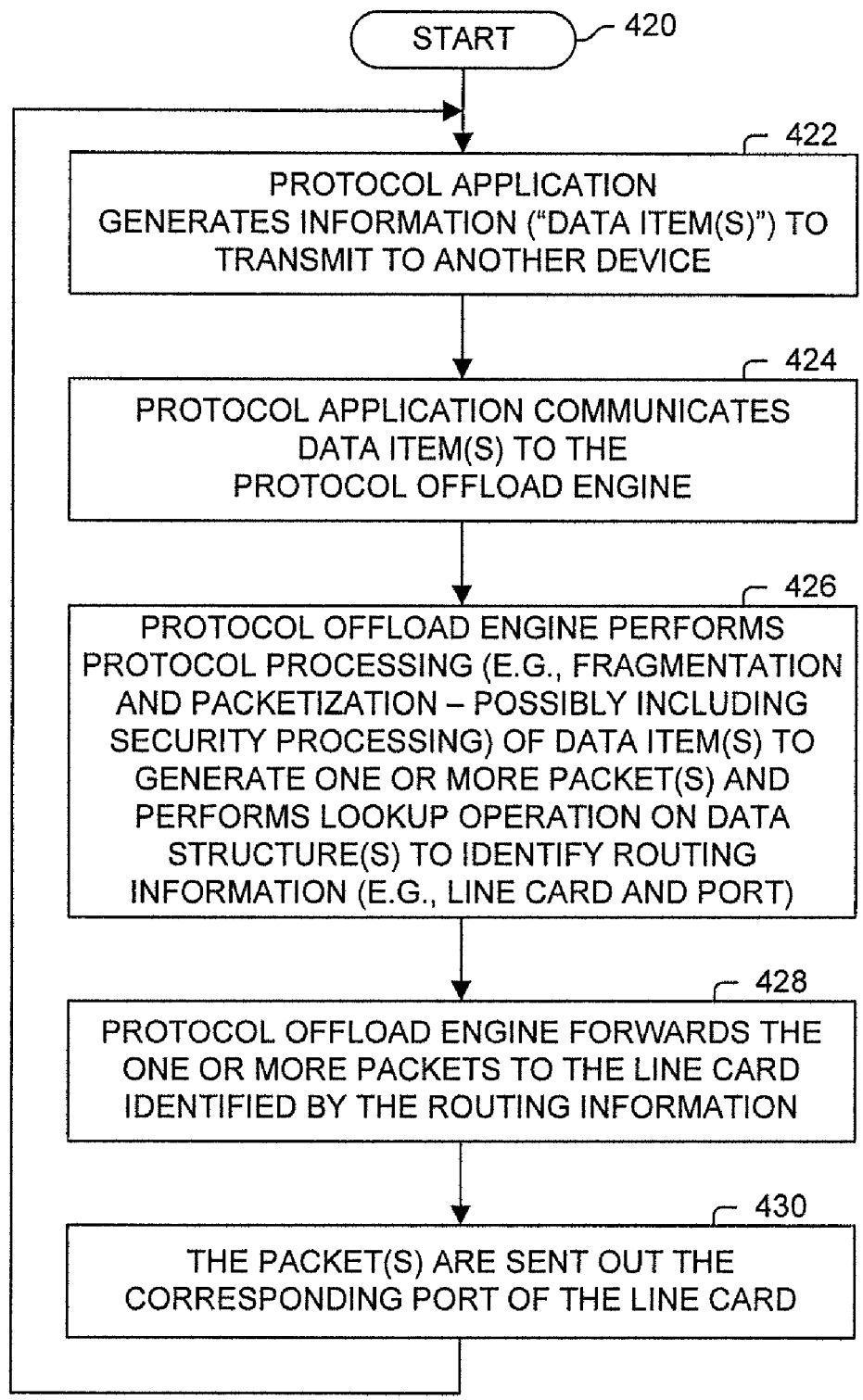
FIG. 4B illustrates a flow diagram of a process used in one embodiment.

FIG. 4B illustrates a process used in one embodiment wherein the protocol offload engine maintains a small, protocol forwarding information base for determining routing information for packets it creates and send out. Processing begins with process block 420. In process block 422, a protocol application generates information (one or more data items) to be communicated to another device. In process block 424, the protocol application communicates these one or more data items to the protocol offload engine. In process block 426, the protocol offload engine performs the protocol processing (e.g., framing and packetization and possibly security processing) of the one or more data items to generate one or more packets and performs a lookup operation on its maintained protocol forwarding information base to determine the line cards and its port to use for sending the generated packets to the external device. In process block 428, the protocol offload engine forwards the generated one or more packets to the line card identified by the routing information; and in process block 430, the packets are sent out of the corresponding port (e.g., identified by the routing information) of the line card. Processing returns to process block 422.

Figure 5:
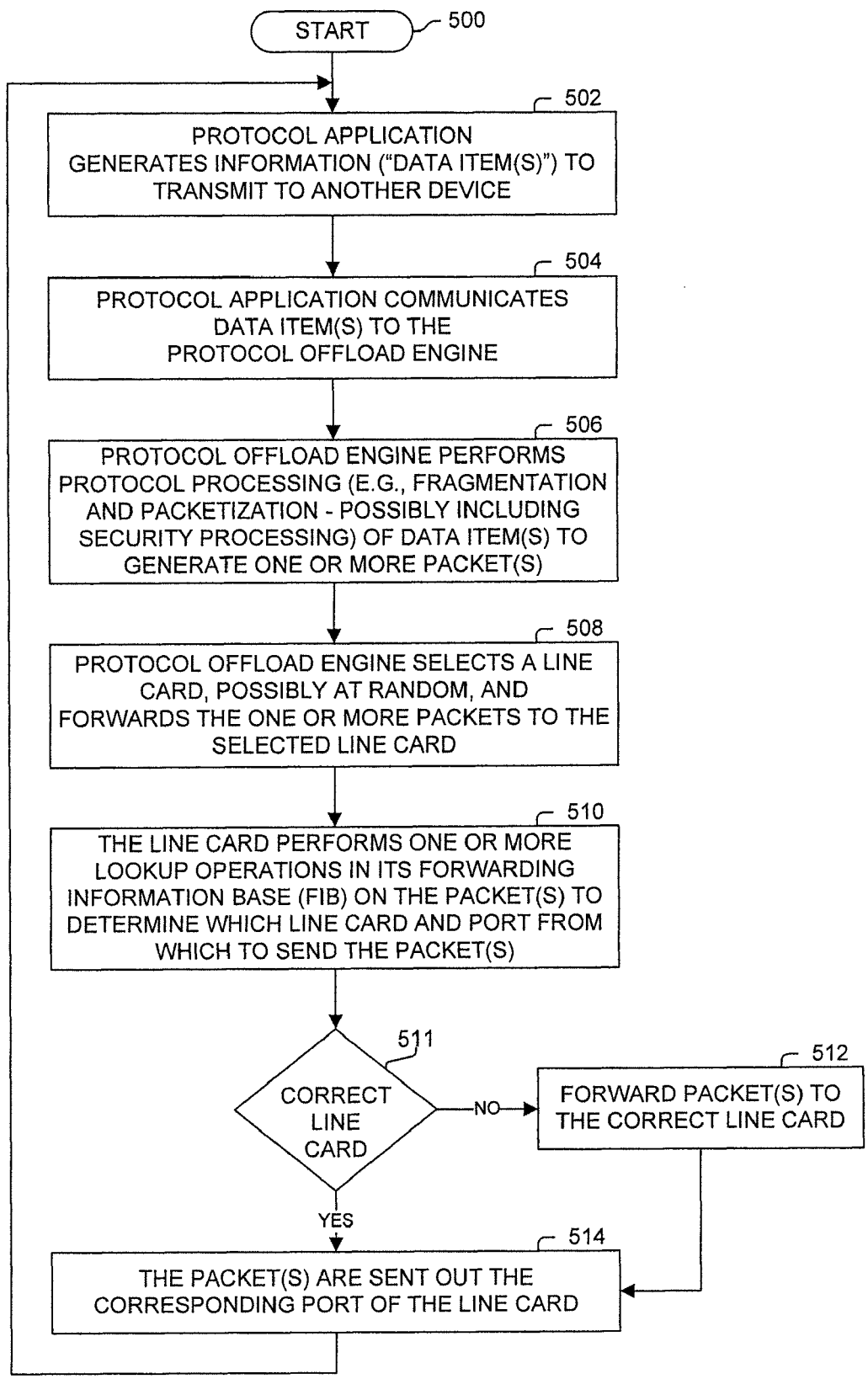
FIG. 5 illustrates a flow diagram of a process used in one embodiment.

FIG. 5 illustrates a process used in one embodiment. Processing begins with process block 500. In process block 502, a protocol application generates information (one or more data items) to be communicated to another device. In process block 504, the protocol application communicates these one or more data items to the protocol offload engine. In process block 506, the protocol offload engine performs the protocol processing (e.g., framing and packetization and possibly security processing) of the one or more data items to generate one or more packets. In process block 508, the protocol offload engine selects a line card and forwards the generated one or more packets to the selected line card. In one embodiment, the selection of the line card is random. In one embodiment, the selection of the line card is made deterministically, such as, but not limited to, in a round-robin fashion among the line cards. In one embodiment, the selection of the line card is made based on a load or other congestion information related to the line cards. In this manner, packets belonging to a same protocol session with an external device can be sent to different line cards. In process block 510, the selected line card performs one or more lookup operations on its forwarding information base to determine the routing information for the one or more packets. As determined in process block 511, if these packets were sent to the correct line card, then in process block 514, they are sent out the port of the line card identified by the routing information; otherwise, in process block 512, they are forwarded to the correct line card, which forwards them out the appropriate port. Processing returns to process block 502.

Figure 6:
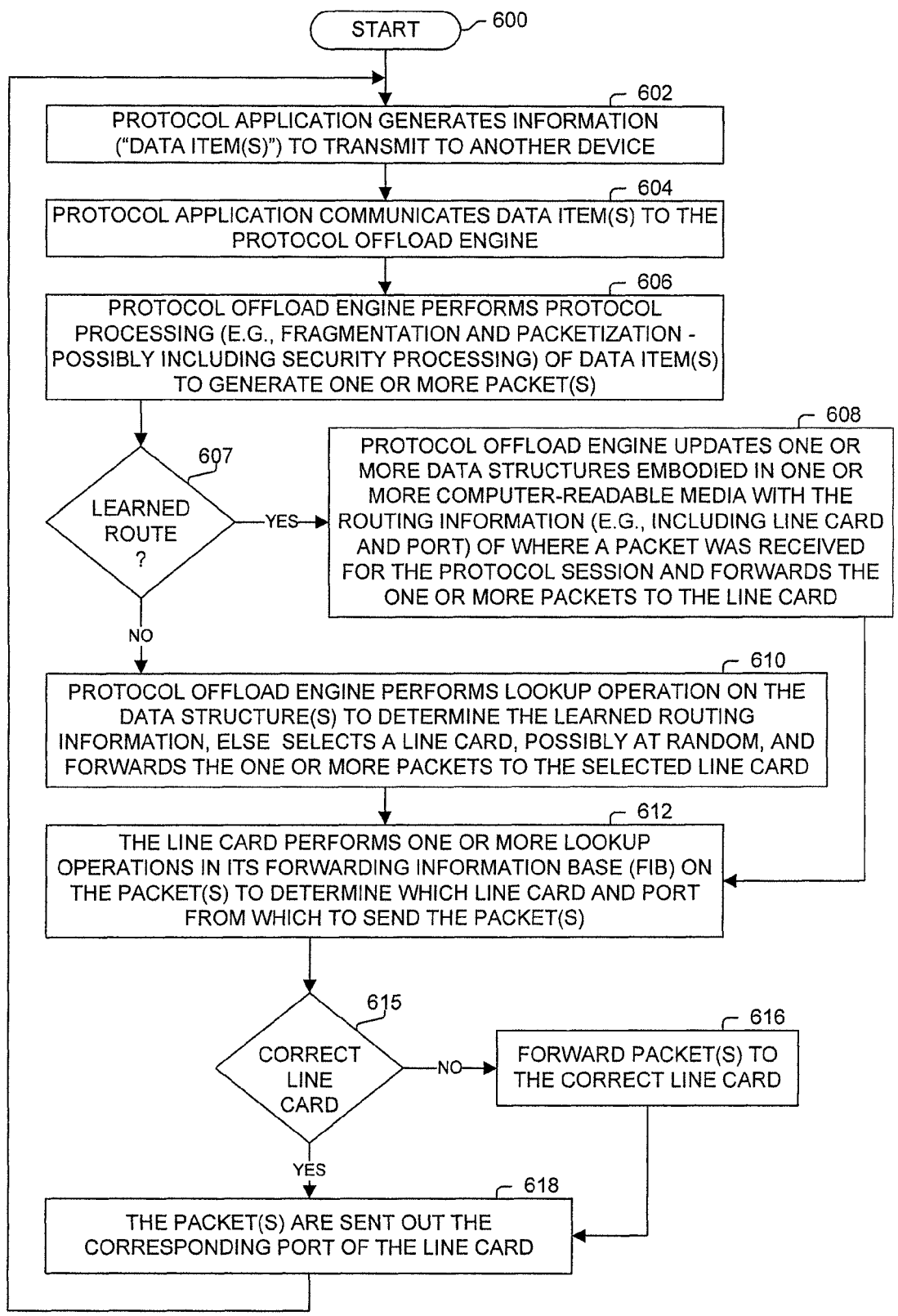
FIG. 6 illustrates a flow diagram of a process used in one embodiment.

FIG. 6 illustrates a process used in one embodiment that possibly learns routing information based on which line card packets belonging to a protocol session are received. In one embodiment, this information is communicated to the protocol offload engine using internal packet information used within a packet switching device.

Processing begins with process block 600. In process block 602, a protocol application generates information (one or more data items) to be communicated to another device. In process block 604, the protocol application communicates these one or more data items to the protocol offload engine. In process block 606, the protocol offload engine performs the protocol processing (e.g., framing and packetization and possibly security processing) of the one or more data items to generate one or more packets. As determined in process block 607, if the information communicated from the control plane processing subsystem includes learned routing information, such as, but not limited to, a line card on which packets were received for a corresponding protocol session, then in process block 608, the protocol offload engine updates one or more data structures embodied in one or more computer-readable media with this routing information and forwards the one or more packets to the line card, and processing proceeds to process block 612. Otherwise, in process block 610, the protocol offload engine performs a lookup operation in its one or more data structures to determine the learned routing information identifying a line card, and if one is not identified by the lookup operation, then the protocol offload engine selects (e.g., randomly, deterministically, congestion/load based or weighted selection, etc.) one of the line cards, and forwards the one or more packets to the line card.

In process block 612, the receiving line card performs one or more lookup operations on its forwarding information base to determine the routing information for the one or more packets. As determined in process block 615, if these packets were received by the correct line card, then in process block 618, they are sent out the port of the line card identified by the routing information; otherwise, in process block 616, they are forwarded to the correct line card, which forwards them out the appropriate port. Processing returns to process block 602.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
performance of select operations by packet switching device; wherein the packet switching device includes: a plurality of line cards; a route processor including a protocol offload engine and a control plane processing subsystem; and wherein said select operations include running, by the control plane processing subsystem, a protocol application to maintain a forwarding information base (FIB) based on communications with external routing devices;

wherein for a particular data item generated by the protocol application to be sent to a particular routing device of said external routing devices, performing particular operations including:

protocol processing, by the protocol offload engine, said particular data item to generate one or more particular packets;

forwarding said one or more particular packets from the protocol offload engine to a particular line card of the plurality of line cards;

determining, by the particular line card, that said one or more particular packets should be sent from a different line card;

forwarding, by the particular line card, said one or more particular packets to the different line card; and sending, by the different line card, said one or more particular packets from the packet switching device.

2. The method of claim 1, wherein said protocol processing of said particular data item includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS).

3. The method of claim 2, wherein said protocol processing of said particular data item includes security protocol processing; wherein said security protocol includes: IP Security (IPSec), Secure Shell (SSH), or Message-Digest algorithm 5 (MD5).

4. The method of claim 1, wherein said particular operations include: randomly selecting the particular line card from the plurality of line cards prior to said operation of forwarding said one or more particular packets from the protocol offload engine to the particular line card.

5. A method, comprising:

performance of select operations by packet switching device; wherein the packet switching device includes: a plurality of line cards; a route processor including a protocol offload engine and a control plane processing subsystem; and wherein said select operations include running, by the control plane processing subsystem, a protocol application to maintain a forwarding information base (FIB) based on communications with external routing devices;

wherein for a particular data item generated by the protocol application to be sent to a particular routing device of said external routing devices, performing particular operations including:

protocol processing, by the protocol offload engine, said particular data item to generate one or more particular packets;

forwarding said one or more particular packets from the protocol offload engine to a particular line card of the plurality of line cards; and sending, by the particular line card, said one or more particular packets from the packet switching device.

6. The method of claim 1, wherein said protocol processing of said particular data item includes security protocol processing.

7. The method of claim 6, wherein said security protocol includes: IP Security (IPSec), Secure Shell (SSH), or Message-Digest algorithm 5 (MD5).

8. The method of claim 1, wherein said protocol processing of said particular data item includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS).

9. The method of claim 8, wherein said protocol processing of said particular data item includes security protocol processing; wherein said security protocol includes: IP Security (IPSec), Secure Shell (SSH), or Message-Digest algorithm 5 (MD5).

10. A method, comprising:

performance of select operations by packet switching device; wherein the packet switching device includes: a plurality of line cards; a route processor including a protocol offload engine and a control plane processing subsystem; and wherein said select operations include:

running, by the control plane processing subsystem, a protocol application to maintain a forwarding information base (FIB) based on communications with external routing devices; and processing, by the protocol offload engine, a plurality of protocol sessions of the route processor communicating with a plurality of external devices; and learning, by the protocol offload engine, on which particular line card packets of a particular protocol session of the plurality of protocol sessions are being received;

wherein for a particular data item generated by the protocol application to be sent to a particular routing device of said external routing devices, performing particular operations including:

protocol processing, by the protocol offload engine, said particular data item to generate one or more particular packets;

forwarding said one or more particular packets from the protocol offload engine to said learned particular of the plurality of line cards; and sending, by said learned particular line card, said one or more particular packets from the packet switching device.

11. The method of claim 10, wherein said learning operation includes learning on which particular port of the particular line card packets of the particular protocol session are being received; and wherein said sending operation includes sending said one or more particular packets from said particular port of the particular line card of the packet switching device.

12. The method of claim 10, wherein said protocol processing of said particular data item includes security protocol processing.

13. The method of claim 10, wherein said protocol processing of said particular data item includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS).

14. A method, comprising:

performance of select operations by packet switching device; wherein the packet switching device includes: a plurality of line cards; a route processor including a protocol offload engine and a control plane processing subsystem; and wherein said select operations include running, by the control plane processing subsystem, a protocol application to maintain a forwarding information base (FIB) based on communications with external routing devices;

wherein for a particular data item generated by the protocol application to be sent to a particular routing device of said external routing devices, performing particular operations including:

performing, by the control plane processing subsystem, a lookup operation in the FIB based on said particular data item to identify routing information for said particular data item;

forwarding said particular data item and said identified routing information to the protocol offload engine;

protocol processing, by the protocol offload engine, said particular data item to generate one or more particular packets;

forwarding said one or more particular packets from the protocol offload engine to a particular line card of the plurality of line cards identified by said routing information; and sending, by the particular line card, said one or more particular packets from the packet switching device.

15. The method of claim 14, wherein said identified routing information includes the identification of a particular port of the particular line card; and wherein said sending operation includes sending said one or more particular packets from said particular port of the particular line card of the packet switching device.

16. The method of claim 14, wherein said select operations include:

generating, by the control plane processing subsystem, a pre-built buffer header for the particular data item; and
communicating the pre-built buffer header to the protocol offload engine;
wherein said protocol processing operation comprises including the pre-built buffer header in said one or more particular packets; wherein the pre-built buffer item includes: a source address of the packet switching device, a source port corresponding to the protocol application, a destination address of the particular routing device, a destination port address, and a protocol type identifier.

17. The method of claim 14, wherein said protocol processing of said particular data item includes security protocol processing.

18. The method of claim 14, wherein said protocol processing of said particular data item includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS).

19. The method of claim 14, wherein said particular operation of performing the lookup operation in is performed prior to said particular operation of forwarding said particular data item and said identified routing information to the protocol offload engine.

20. A method, comprising:

performance of select operations by packet switching device; wherein the packet switching device includes: a plurality of line cards; a route processor including a protocol offload engine and a control plane processing subsystem; and wherein said select operations include:

running, by the control plane processing subsystem, a protocol application to maintain a forwarding information base (FIB), comprising routing information, based on communications with external routing devices; and storing said routing information in the protocol offload engine; and wherein for a particular data item generated by the protocol application to be sent to a particular routing device of said external routing devices, performing particular operations including:

protocol processing, by the protocol offload engine, said particular data item to generate one or more particular packets;

determining, by the protocol offload engine, a particular line card of the plurality of line cards for said one or more particular packets based on said routing information said stored in the protocol offload engine;

forwarding said one or more particular packets from the protocol offload engine to the particular line card of the plurality of line cards; and sending, by the particular line card, said one or more particular packets from the packet switching device.

21. The method of claim 20, wherein said routing information for said one or more particular packets includes the identification of a particular port of the particular line card; and wherein said sending operation includes sending said one or more particular packets from said particular port of the particular line card of the packet switching device.

22. The method of claim 20, wherein said protocol processing of said particular data item includes security protocol processing.

23. The method of claim 20, wherein said protocol processing of the particular packet includes Transmission Control Protocol (TCP) or Internet Protocol (IP) processing of the particular packet; and wherein the protocol application includes a routing application comprising Border Gateway Protocol (BGP), Open Shortest Path First (OSPF), Resource Reservation Protocol (RSVP), or Intermediate System-to-Intermediate System (IS-IS).

* * * * *